(12) United States Patent
Zhu et al.

(10) Patent No.: US 12,500,720 B2
(45) Date of Patent: Dec. 16, 2025

(54) TRANSMISSION USING DMRS FROM TWO CODE DIVISION MULTIPLEXING GROUPS

(71) Applicant: LENOVO (BEIJING) LIMITED, Beijing (CN)

(72) Inventors: Chenxi Zhu, Fairfax, VA (US); Bingchao Liu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 408 days.

(21) Appl. No.: 18/015,399

(22) PCT Filed: Jul. 10, 2020

(86) PCT No.: PCT/CN2020/101376
§ 371 (c)(1),
(2) Date: Jan. 10, 2023

(87) PCT Pub. No.: WO2022/006864
PCT Pub. Date: Jan. 13, 2022

(65) Prior Publication Data
US 2023/0261833 A1     Aug. 17, 2023

(51) Int. Cl.
*H04L 5/00* (2006.01)
*H04W 72/23* (2023.01)

(52) U.S. Cl.
CPC ........... *H04L 5/0051* (2013.01); *H04W 72/23* (2023.01)

(58) Field of Classification Search
CPC ... H04L 5/0023; H04L 5/0044; H04L 5/0051; H04L 5/0094; H04W 72/23
See application file for complete search history.

(56) References Cited

U.S. PATENT DOCUMENTS

| 11,265,122 B2 * | 3/2022 | Khoshnevisan | ...... H04L 5/0051 |
| 11,363,551 B2 * | 6/2022 | Kim | ................... H04W 28/0236 |

(Continued)

FOREIGN PATENT DOCUMENTS

| CN | 204355929 U | 5/2015 |
| CN | 207275992 U | 4/2018 |

(Continued)

OTHER PUBLICATIONS

International Searching Authority, "Written Opinion of the International Searching Authority," PCT/CN2019/101376, Dec. 20, 2019, pp. 1-3.

*Primary Examiner* — Eric Nowlin
(74) *Attorney, Agent, or Firm* — Kunzler Bean & Adamson

(57) ABSTRACT

Apparatuses, methods, and systems are disclosed for transmission using DMRS from two code division multiplexing groups. One method (500) includes transmitting (502) information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

20 Claims, 6 Drawing Sheets

(56) References Cited

U.S. PATENT DOCUMENTS

| | | | |
|---|---|---|---|
| 11,424,888 B2* | 8/2022 | Liu | H04L 5/0051 |
| 12,063,174 B2* | 8/2024 | Kim | H04B 7/0408 |
| 12,101,795 B2* | 9/2024 | Gao | H04L 5/0023 |
| 12,143,320 B2* | 11/2024 | Hu | H04L 5/0026 |
| 12,191,958 B2* | 1/2025 | Liu | H04B 7/0632 |
| 12,193,043 B2* | 1/2025 | Kim | H04W 72/1263 |
| 12,244,529 B2* | 3/2025 | Kim | H04L 1/00 |
| 2018/0332566 A1* | 11/2018 | You | H04W 74/0833 |
| 2020/0119880 A1* | 4/2020 | Liu | H04L 5/0051 |
| 2020/0221487 A1* | 7/2020 | Lee | H04L 5/0091 |
| 2020/0229161 A1* | 7/2020 | Raghavan | H04W 24/10 |
| 2022/0150019 A1* | 5/2022 | Xiao | H04L 5/0053 |
| 2022/0158805 A1* | 5/2022 | Frenne | H04L 5/0053 |
| 2022/0216964 A1* | 7/2022 | Mondal | H04L 5/0023 |
| 2022/0224472 A1* | 7/2022 | Kim | H04B 7/06 |
| 2022/0232614 A1* | 7/2022 | Gao | H04W 72/23 |
| 2022/0264630 A1* | 8/2022 | Xiao | H04W 72/23 |
| 2022/0302981 A1* | 9/2022 | Liu | H04B 7/0632 |
| 2023/0261833 A1* | 8/2023 | Zhu | H04L 5/0044 370/329 |
| 2023/0396386 A1* | 12/2023 | Zhu | H04L 5/0053 |
| 2025/0106848 A1* | 3/2025 | Cirik | H04L 1/08 |
| 2025/0142567 A1* | 5/2025 | Liu | H04W 76/20 |

FOREIGN PATENT DOCUMENTS

| | | | | |
|---|---|---|---|---|
| CN | 207973385 U | | 10/2018 | |
| CN | 110771115 A | * | 2/2020 | ............ H04L 5/0051 |
| CN | 114424480 A | * | 4/2022 | ............ H04L 5/0035 |
| CN | 114424480 B | * | 4/2024 | ............ H04L 5/0035 |
| JP | 2004182409 A | | 7/2004 | |
| WO | WO-2021056530 A1 | * | 4/2021 | ............ H04L 5/0035 |
| WO | WO-2021189277 A1 | * | 9/2021 | ............ H04L 1/1822 |

\* cited by examiner

TRANSMISSION USING DMRS FROM TWO CODE DIVISION MULTIPLEXING GROUPS

FIELD

The subject matter disclosed herein relates generally to wireless communications and more particularly relates to transmission using DMRS from two code division multiplexing groups.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, transmissions may be made from multiple TRPs.

BRIEF SUMMARY

Methods for transmission using DMRS from two code division multiplexing groups are disclosed. Apparatuses and systems also perform the functions of the methods. In one embodiment, the method includes transmitting information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

An apparatus for transmission using DMRS from two code division multiplexing groups, in one embodiment, includes a transmitter that transmits information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

A method for transmission using DMRS from two code division multiplexing groups includes receiving information on a physical downlink shared channel from at least one network unit, wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state.

An apparatus for transmission using DMRS from two code division multiplexing groups, in one embodiment, includes a receiver that receives information on a physical downlink shared channel from at least one network unit, wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
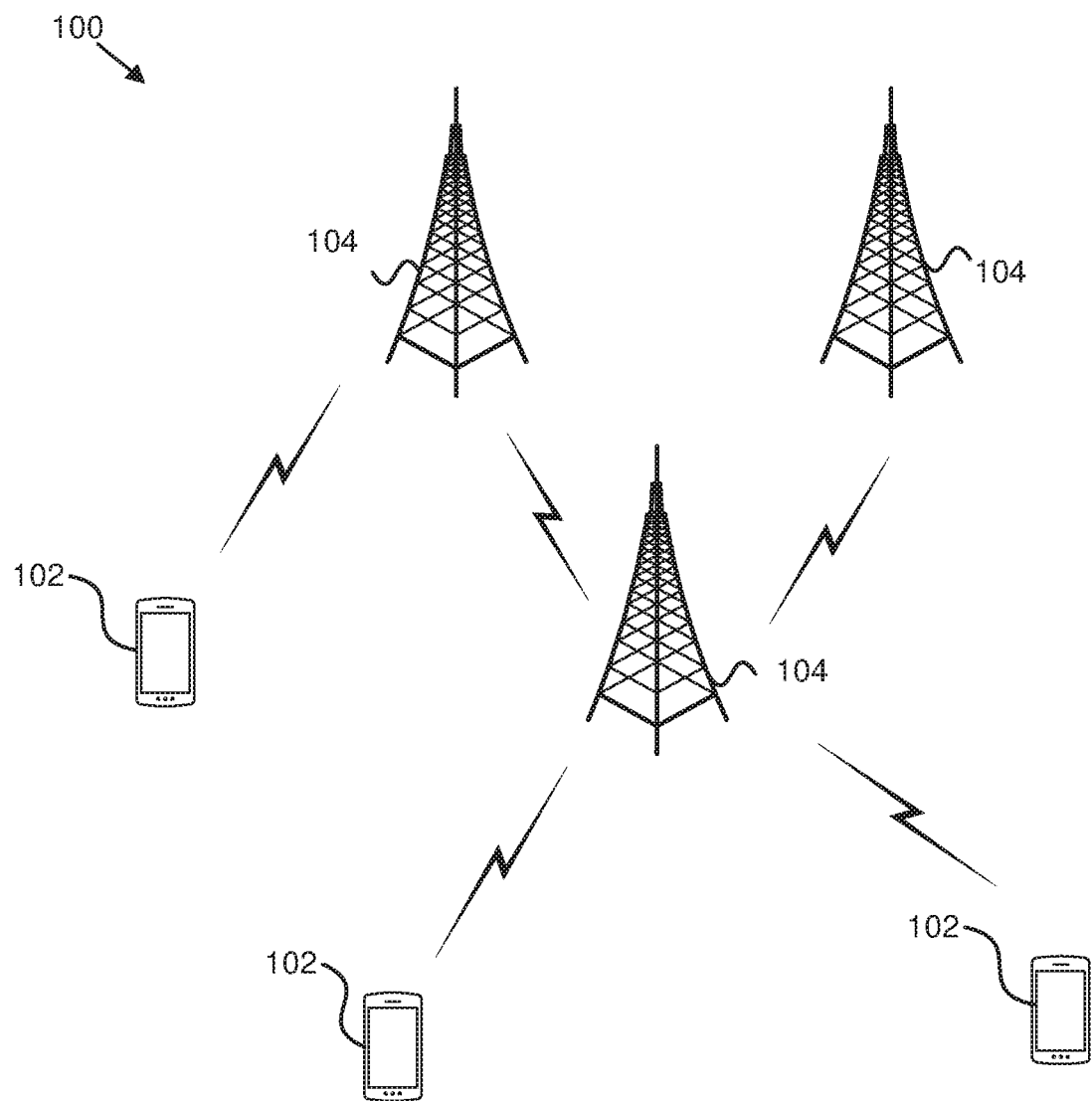
FIG. 1 is a schematic block diagram illustrating one embodiment of a wireless communication system for transmission using DMRS from two code division multiplexing groups.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmission using DMRS from two code division multiplexing groups. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art.

The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a network unit 104 may transmit information on a physical downlink shared channel to a user equipment (e.g., remote unit 102), wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports. Accordingly, a network unit 104 may be used for transmission using DMRS from two code division multiplexing groups.

In various embodiments, a remote unit 102 may receive information on a physical downlink shared channel from at least one network unit (e.g., network unit 104), wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state. Accordingly, a remote unit 102 may be used for transmission using DMRS from two code division multiplexing groups.

Figure 2:
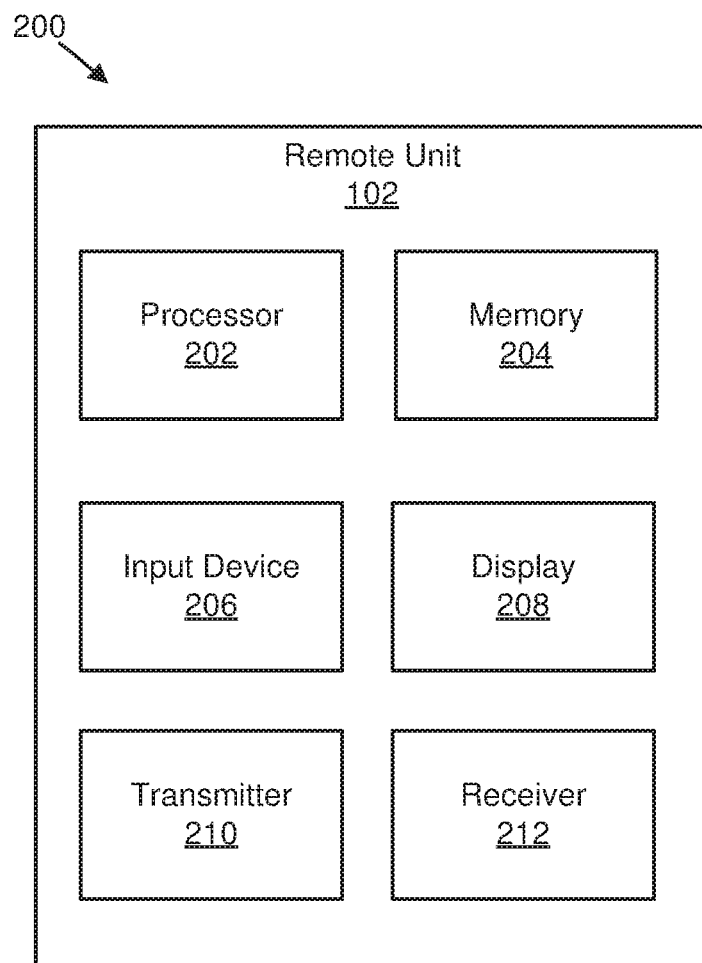
FIG. 2 is a schematic block diagram illustrating one embodiment of an apparatus that may be used for transmission using DMRS from two code division multiplexing groups.

FIG. 2 depicts one embodiment of an apparatus 200 that may be used for transmission using DMRS from two code division multiplexing groups. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may receive information on a physical downlink shared channel from at least one network unit, wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
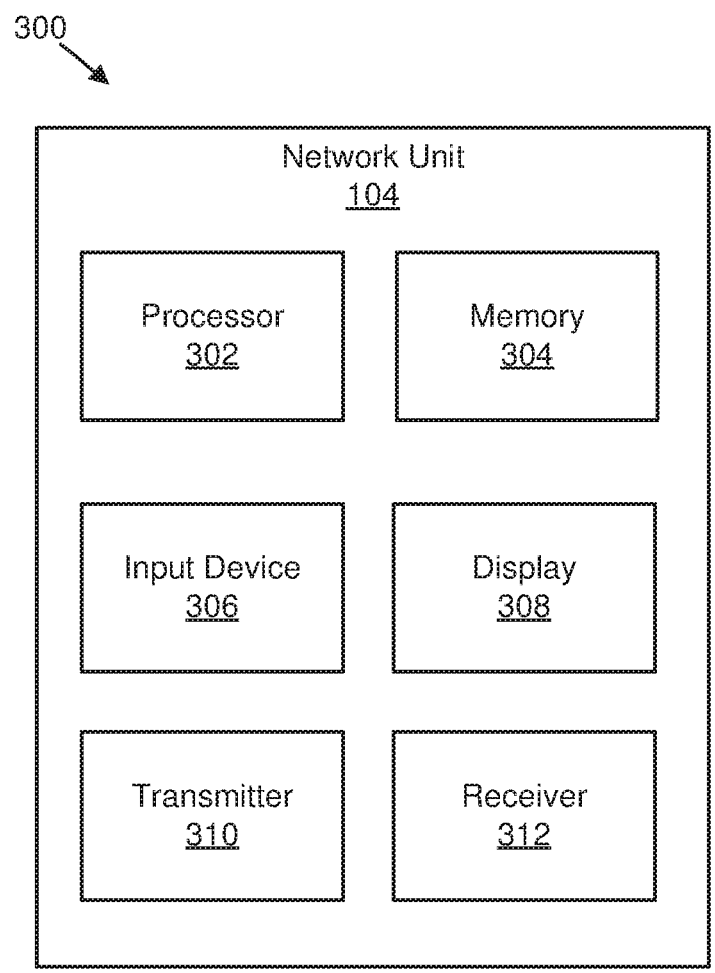
FIG. 3 is a schematic block diagram illustrating one embodiment of an apparatus that may be used for transmission using DMRS from two code division multiplexing groups.

FIG. 3 depicts one embodiment of an apparatus 300 that may be used for transmission using DMRS from two code division multiplexing groups. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as for increased reliability for high mobility UEs, there may be different transmission schemes to enhance multi-TRP operation. Such embodiments use transmissions from two TRPs as spatial diversity and do not require their signal strength to be close thereby resulting in increased robustness in a high mobility environment.

In various configurations, two different transmission methods may be used for multi-TRP PDSCH transmission. The first one is a single-DCI scheduled single PDSCH transmission sent from two TRPs within the same cell. This may use an ideal or close-to-ideal backhaul connection between the two TRPs. The DL TCI codepoint in DCI format 1_1 may indicate two different TCI states, and the DM-RS in different CDM groups may be quasi-collocated with respect to the TCI states. A single codeword may be mapped to all layers associated with both TRP states. Such embodiments may use the signal strength from the two different TRPs (with two TCI states) having similar signal strength, so a single codeword with a single MCS may be mapped to the layers from both TCIs without distinguishing between the two TCI states.

Figure 4:
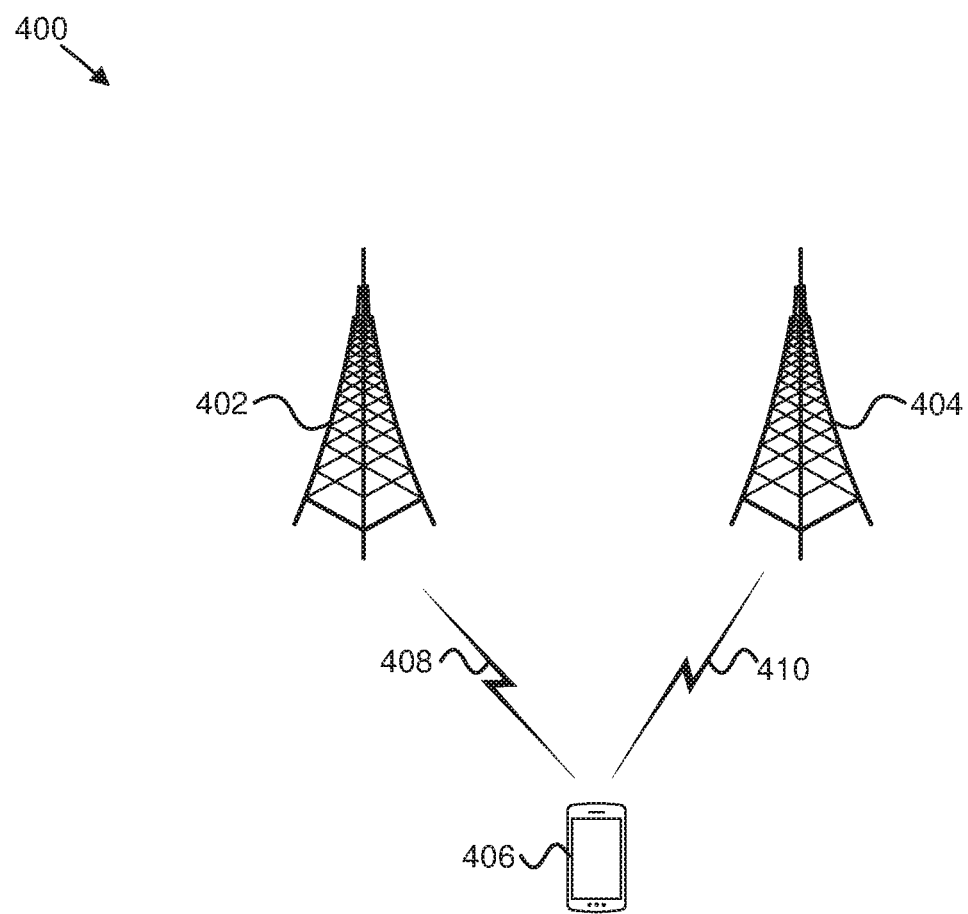
FIG. 4 is a schematic block diagram illustrating one embodiment of a multi-TRP system.

FIG. 4 is a schematic block diagram illustrating one embodiment of a multi-TRP system 400. The multi-TRP system 400 includes a first TRP 402 (e.g., TRP1), a second TRP 404 (e.g., TRP2), and a UE 406. The first TRP 402 communicates with the UE 406 using a first transmission 408 and the second TRP 404 communicates with the UE 406 using a second transmission 410. Each of the first transmission 408 and the second transmission 410 may include one or more messages transmitted using one or more transmission means. The first transmission 408 may include CSI-RS1 and may be transmitted with DMRS ports in a first DMRS group (e.g., first CDM group). The first transmission 408 may further include a codeword CW1 having a redundancy version RV0. The first transmission 408 may use a first PTRS. Moreover, the second transmission 410 may include CSI-RS2 and may be transmitted with DMRS ports in a second DMRS group (e.g., second CDM group). The second transmission 410 may further include the same codeword CW1 having the same redundancy version RV0. The second transmission 410 may use a second PTRS.

The two TRPs (e.g., the first TRP 402 and the second TRP 404) may be part of a same cell and may transmit their CSI-RS in separate CSI-RS resources. As such, separate CSI-RS resources may be configured and transmitted for different TRPs. By separating CSI-RS signals for different TRPs in a time domain and/or frequency domain, the UE 406 may easily distinguish different DL signals from different TRPs with different pathloss and different Doppler shifts and may estimate each channel respectively. Pairs of NZP-CSI-RS resources may be configured for channel measurement and interference measurement. Transmission of PDSCH with multi-TRP in two TCI states may be indicated by a TCI field in DCI (e.g., DCI format 1_1 or 1_2). Each TCI state may be associated with a DM-RS (e.g., all used DMRS ports sent from a TRP, all DMRS ports in a DMRS CDM group) sent from a TRP and specific DM-RS ports in a PDSCH. The number (e.g., K) of DM-RS ports transmitted by the two TRPs may be the same. For example, the DM-RS ports transmitted by the first TRP may be $\{P_1^{TCI1}, \ldots, P_K^{TCI1}\}$ and the DM-RS ports transmitted by the second TRP may be $\{P_1^{TCI2}, \ldots, P_K^{TCI2}\}$. All of the K ports transmitted by the first TRP 402 may be in one DMRS CDM group (e.g., the first CDM group) and all of the K ports transmitted by the second TRP 404 may be in another DMRS CDM group (e.g., the second CDM group). The total of the 2K ports may be in 2 different CDM groups. The value of K may be up to 4 making the total number of DM-RS ports (e.g., which may always be an even number) up to 8. Corresponding DM-RS ports in the two CDM groups may be paired together $(P_1^{TCI1}, P_1^{TCI2})$, $(P_2^{TCI1}, P_2^{TCI2})$, ..., $(P_K^{TCI1}, P_K^{TCI2})$, and each pair may form a virtual DM-RS port to collectively transmit a data layer of the PDSCH. This may be viewed as a SFN transmission of a data layer by K pairs of DM-RS ports.

In some embodiments, a total of K layers of data may be transmitted in a PDSCH, and a single codeword having a single redundancy value (e.g., as signaled in DCI or by a higher layer) may apply to these K layers following a codeword to layer and/or RE mapping rule.

In various embodiments, a single data layer may have two separate TCI states associated with two TRPs.

In certain embodiments, two TRPs transmit the same codeword of the same RV using their K DM-RS antenna ports in the same RE resources. Because the same information is transmitted by both sets of DM-RS ports, the same modulation symbols may be transmitted by pairs of corresponding DM-RS ports in the same REs. The codeword sent by a TRP is mapped to the K DM-RS ports associated with the corresponding TCI state in K layers. From the UE point of view, the UE knows that the same RV of the same word is transmitted by both TRPs on pairs of DM-RS symbols mapped to the same set of REs with the same order, therefore the UE may soft-combine the signals of corresponding pairs of layers from two TRPs and decode the soft-combination of the signals.

In FIG. 4, codeword CW1 is transmitted by the first TRP 402 and the second TRP 404. A DMRS type may be set to type 1 for PDSCH, and a maximum length of DMRS symbols may be maxLength=1. DCI (e.g., DCI format 1-1) may indicate 4 DM-RS ports used are ports {0, 1, 2, 3}, where ports {0, 1} belong to the first CDM group and ports {2, 3} belong to the second CDM group. A TCI field in the DCI may be configured by MAC_CE to indicate two TCI states QCLed with respect to two NZP-CSI-RS resources (e.g., CSI-RS1 and CRI-RS2) from the two TRPs. Two PT-RS ports may be transmitted, where the first PTRS is associated with DM-RS ports {0, 1} and the second PTRS is associated with DM-RS ports {2, 3}. CW1 may be transmitted in 2 layers, the first layer sent by DM-RS ports {0, 2}, and the second layer sent by DM-RS ports {1, 3}. The codeword may be mapped to 2 layers.

To support joint transmission with K having a value up to 4, a number of DM-RS ports from the two TRPs may include port combinations for (1+1), (2+2), (3+3), and/or (4+4).

If a UE is configured in certain transmission modes, only a subset of DM-RS ports indications may be used. The possible port combinations may include (1+1), (2+2), (3+3), and/or (4+4). In various embodiments, there may be a DM-RS antenna ports subset with a reduced number of bits used for antenna port indication in DCI. For different DM-RS types and maximum DM-RS length, an embodiment of an antenna port indication table is illustrated in Table 1. For dmrs-Type=1 or 2, maxLength=1, only 1 bit is needed in DCI to indicate antenna ports. For dmrs-Type=1 or 2, maxLength=2, only 2 bits are needed in the DCI to indicate the antenna ports. This is a significant reduction of DCI overhead compared with other DCI formats (e.g., DCI format 1_1 and 1_2).

TABLE 1

Subset of DM-RS port indication for the new PDSCH transmission mode

| DM-RS port combination | Antenna ports codepoint value | dmrs-Type = 1, maxLength = 1 | dmrs-Type = 1, maxLength = 2 | dmrs-Type = 2, maxLength = 1 | dmrs-Type = 2, maxLength = 2 |
|---|---|---|---|---|---|
| 1 + 1 | 0 | 0, 2 | 0, 2 | 0, 2 | 0, 2 |
| 2 + 2 | 1 | 0-3 | 0-3 | 0-3 | 0-3 |
| 3 + 3 | 2 | Not applicable | 0, 1, 2, 3, 4, 6 | Not applicable | 0, 1, 2, 3, 6, 8 |
| 4 + 4 | 3 | Not applicable | 0-7 | Not applicable | 0, 1, 2, 3, 6, 7, 8, 9 |

As may be appreciated, embodiments described herein may not be dependent on signals from two TRPs having similar strength. The composite channels (($P_1^{TCI1}+P_1^{TCI2}$), ($P_2^{TCI1}+P_2^{TCI2}$), ..., ($P_K^{TCI1}+P_K^{TCI2}$)) from both TRPs may be used for transmission of the same symbols. The received signal of each layer is the sum of two antenna ports. This makes it insensitive to a difference strength between them. Embodiments described herein may also use more spatial diversity by imploring more layers from each TRPs. Up to 8 spatial ranks may be used for 4 layers of data transmission, which is an improvement over other embodiments that have a maximum of 4 ranks for 4 layer transmission. Thus, robustness of a PDSCH transmission may be increased. Different TRPs have separate TCI states and individual DM-RS ports, thereby making it easier for a UE to estimate an individual channel from each TRP even if received signals have very different Doppler shift and Doppler spread. Accordingly, by separating a RS from different TRPs, only the UE needs to estimate a single value of Doppler shift for a DM-RS port.

In some embodiments, a transmission mode may be configured by higher layer signaling (e.g., RRC) for PDSCH. In certain embodiments, once configured, a UE may know that DM-RS ports are used in pairs and may decode each data layer based on a corresponding pair of DM-RS ports.

Figure 5:
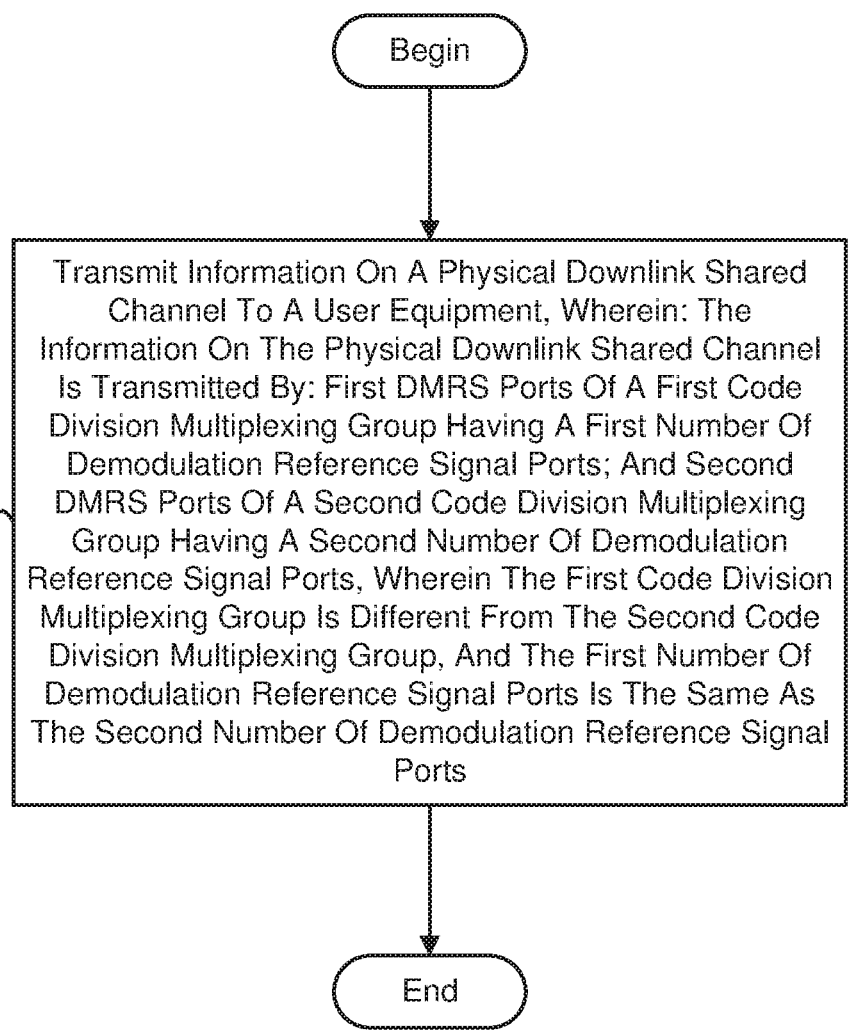
FIG. 5 is a schematic flowchart diagram illustrating one embodiment of a method for transmission using DMRS from two code division multiplexing groups.

FIG. 5 is a schematic flow chart diagram illustrating one embodiment of a method 500 for transmission using DMRS from two code division multiplexing groups. In some embodiments, the method 500 is performed by an apparatus, such as the network unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 information on a physical downlink shared channel to a user equipment (e.g., remote unit 102), wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

In certain embodiments, the information comprises a codeword, and the codeword is mapped to resource elements having a layer number equal to a demodulation reference signal port number of a plurality of demodulation reference signal ports of demodulation reference signal in a code division multiplexing group. In some embodiments, demodulation reference signal ports of different transmission configuration indications are in different code division multiplexing groups. In various embodiments, each demodulation reference signal port of the demodulation reference signal ports is indicated in downlink control information by a different transmission configuration indicator state.

In one embodiment, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state. In certain embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group. In some embodiments, the method 500 further comprises transmitting downlink control information to the user equipment.

In various embodiments, the downlink control information comprises a maximum of two bits to indicate antenna ports from an antenna ports table. In one embodiment, the antenna ports table comprises a maximum of four rows. In certain embodiments, the antenna ports table consists of entries having the same number of demodulation reference signal ports in the first code division multiplexing group and the second code division multiplexing group.

In some embodiments, the downlink control information comprises a downlink control information format comprising a transmission configuration indicator codepoint indicating two transmission configuration indicator states. In various embodiments, the downlink control information comprises: a first transmission configuration indicator state; and a second transmission configuration indicator state, wherein the first transmission configuration indicator state is different from the second transmission configuration indicator state. In one embodiment, the method 500 further comprises transmitting configuration information using radio resource control signaling to the user equipment, wherein the configuration information indicates a transmission mode for transmitting the information. In certain embodiments, the method 500 further comprises receiving radio resource control signaling from the user equipment, wherein the radio resource control signaling indicates a capability of the user equipment to receive the information.

Figure 6:
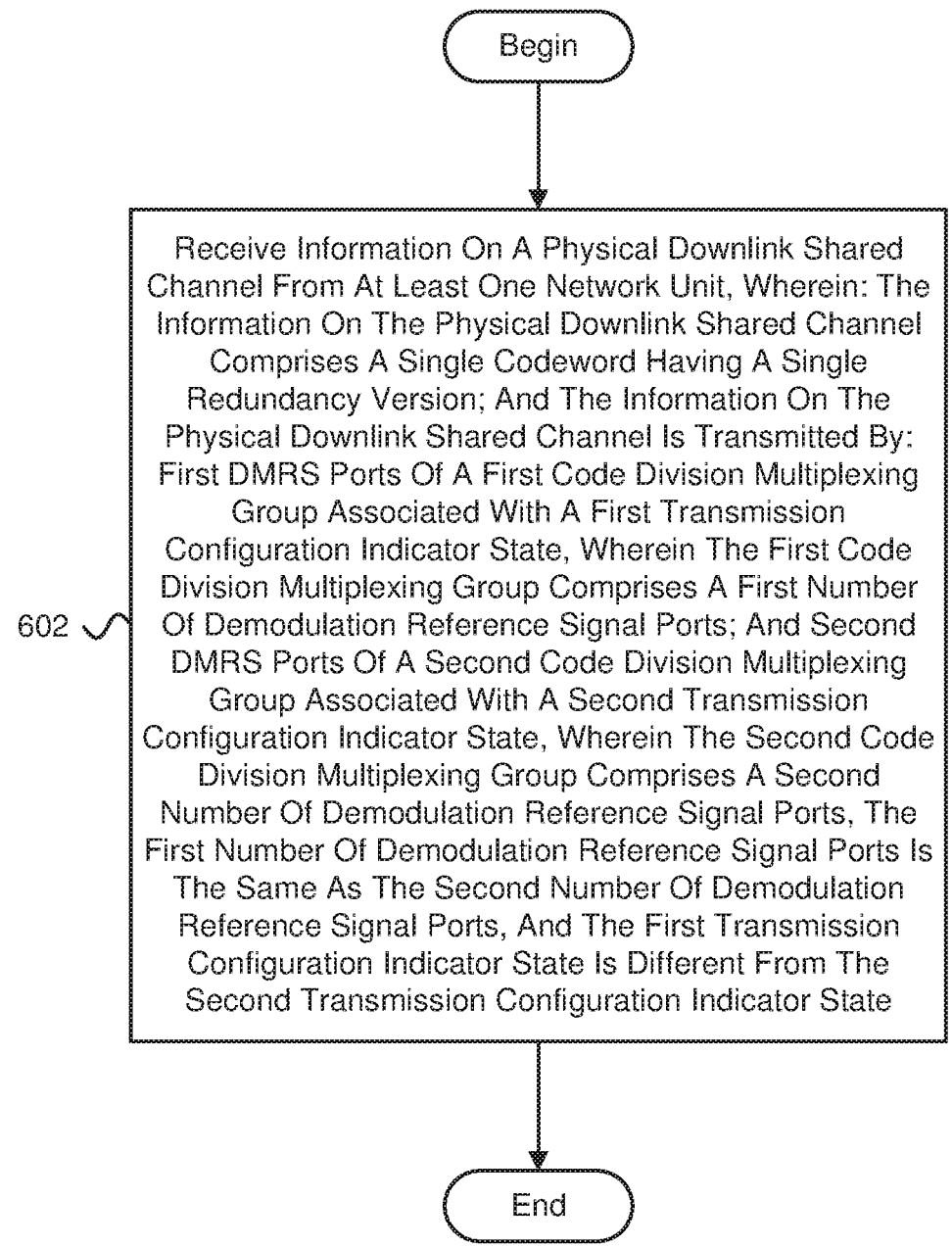
FIG. 6 is a schematic flowchart diagram illustrating another embodiment of a method for transmission using DMRS from two code division multiplexing groups.

FIG. 6 is a schematic flow chart diagram illustrating one embodiment of a method 600 for transmission using DMRS from two code division multiplexing groups. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 information on a physical downlink shared channel from at least one network unit (e.g., network unit 104), wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state.

In certain embodiments, receiving the information comprises receiving a modulation symbol of the single redundancy version of the single codeword on both of: a first demodulation reference signal port associated with the first transmission configuration indicator state; and a second demodulation reference signal port associated with the second transmission configuration indicator state. In some embodiments, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state. In various embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group.

In one embodiment, the method 600 further comprises receiving downlink control information from the at least one network unit. In certain embodiments, the downlink control information comprises a maximum of two bits to indicate antenna ports from an antenna ports table. In some embodiments, the antenna ports table comprises a maximum of four rows.

In various embodiments, the antenna ports table consists of entries having the same number of demodulation reference signal ports in the first code division multiplexing group and the second code division multiplexing group. In one embodiment, the downlink control information comprises a downlink control information format comprising a transmission configuration indicator codepoint indicating two transmission configuration indicator states. In certain embodiments, the method 600 further comprises soft-combining signals received from a first demodulation reference signal port associated with the first transmission configuration indicator state and a second demodulation reference signal port associated with the second transmission configuration indicator state.

In some embodiments, the method 600 further comprises transmitting radio resource control signaling to the at least one network unit, wherein the radio resource control signaling indicates a capability of the user equipment to receive the information. In various embodiments, the method 600 further comprises receiving configuration information via radio resource control signaling, wherein the configuration information indicates a transmission mode used for transmitting the information.

In one embodiment, a method comprises: transmitting information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

In certain embodiments, the information comprises a codeword, and the codeword is mapped to resource elements having a layer number equal to a demodulation reference signal port number of a plurality of demodulation reference signal ports of demodulation reference signal in a code division multiplexing group.

In some embodiments, demodulation reference signal ports of different transmission configuration indications are in different code division multiplexing groups.

In various embodiments, each demodulation reference signal port of the demodulation reference signal ports is indicated in downlink control information by a different transmission configuration indicator state.

In one embodiment, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state.

In certain embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group.

In some embodiments, the method further comprises transmitting downlink control information to the user equipment.

In various embodiments, the downlink control information comprises a maximum of two bits to indicate antenna ports from an antenna ports table.

In one embodiment, the antenna ports table comprises a maximum of four rows.

In certain embodiments, the antenna ports table consists of entries having the same number of demodulation reference signal ports in the first code division multiplexing group and the second code division multiplexing group.

In some embodiments, the downlink control information comprises a downlink control information format comprising a transmission configuration indicator codepoint indicating two transmission configuration indicator states.

In various embodiments, the downlink control information comprises: a first transmission configuration indicator state; and a second transmission configuration indicator state, wherein the first transmission configuration indicator state is different from the second transmission configuration indicator state.

In one embodiment, the method further comprises transmitting configuration information using radio resource control signaling to the user equipment, wherein the configuration information indicates a transmission mode for transmitting the information.

In certain embodiments, the method further comprises receiving radio resource control signaling from the user equipment, wherein the radio resource control signaling indicates a capability of the user equipment to receive the information.

In one embodiment, an apparatus comprises: a transmitter that transmits information on a physical downlink shared channel to a user equipment, wherein: the information on the physical downlink shared channel is transmitted by: first demodulation reference signal ports of a first code division multiplexing group having a first number of demodulation reference signal ports; and second demodulation reference signal ports of a second code division multiplexing group having a second number of demodulation reference signal ports, wherein the first code division multiplexing group is different from the second code division multiplexing group, and the first number of demodulation reference signal ports is the same as the second number of demodulation reference signal ports.

In certain embodiments, the information comprises a codeword, and the codeword is mapped to resource elements having a layer number equal to a demodulation reference signal port number of a plurality of demodulation reference signal ports of demodulation reference signal in a code division multiplexing group.

In some embodiments, demodulation reference signal ports of different transmission configuration indications are in different code division multiplexing groups.

In various embodiments, each demodulation reference signal port of the demodulation reference signal ports is indicated in downlink control information by a different transmission configuration indicator state.

In one embodiment, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state.

In certain embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group.

In some embodiments, the transmitter transmits downlink control information to the user equipment.

In various embodiments, the downlink control information comprises a maximum of two bits to indicate antenna ports from an antenna ports table.

In one embodiment, the antenna ports table comprises a maximum of four rows.

In certain embodiments, the antenna ports table consists of entries having the same number of demodulation reference signal ports in the first code division multiplexing group and the second code division multiplexing group.

In some embodiments, the downlink control information comprises a downlink control information format comprising a transmission configuration indicator codepoint indicating two transmission configuration indicator states.

In various embodiments, the downlink control information comprises: a first transmission configuration indicator state; and a second transmission configuration indicator state, wherein the first transmission configuration indicator state is different from the second transmission configuration indicator state.

In one embodiment, the transmitter transmits configuration information using radio resource control signaling to the user equipment, and the configuration information indicates a transmission mode for transmitting the information.

In certain embodiments, the apparatus further comprises a receiver that receives radio resource control signaling from the user equipment, wherein the radio resource control signaling indicates a capability of the user equipment to receive the information.

In one embodiment, a method comprises: receiving information on a physical downlink shared channel from at least one network unit, wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state.

In certain embodiments, receiving the information comprises receiving a modulation symbol of the single redundancy version of the single codeword on both of: a first demodulation reference signal port associated with the first transmission configuration indicator state; and a second demodulation reference signal port associated with the second transmission configuration indicator state.

In some embodiments, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state.

In various embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group.

In one embodiment, the method further comprises receiving downlink control information from the at least one network unit.

In certain embodiments, the downlink control information comprises a maximum of two bits to indicate antenna ports from an antenna ports table.

In some embodiments, the antenna ports table comprises a maximum of four rows.

In various embodiments, the antenna ports table consists of entries having the same number of demodulation reference signal ports in the first code division multiplexing group and the second code division multiplexing group.

In one embodiment, the downlink control information comprises a downlink control information format comprising a transmission configuration indicator codepoint indicating two transmission configuration indicator states.

In certain embodiments, the method further comprises soft-combining signals received from a first demodulation reference signal port associated with the first transmission configuration indicator state and a second demodulation reference signal port associated with the second transmission configuration indicator state.

In some embodiments, the method further comprises transmitting radio resource control signaling to the at least one network unit, wherein the radio resource control signaling indicates a capability of the user equipment to receive the information.

In various embodiments, the method further comprises receiving configuration information via radio resource control signaling, wherein the configuration information indicates a transmission mode used for transmitting the information.

In one embodiment, an apparatus comprises: a receiver that receives information on a physical downlink shared channel from at least one network unit, wherein: the information on the physical downlink shared channel comprises a single codeword having a single redundancy version; and the information on the physical downlink shared channel is transmitted by: first demodulation reference signal ports of a first code division multiplexing group associated with a first transmission configuration indicator state, wherein the first code division multiplexing group comprises a first number of demodulation reference signal ports; and second demodulation reference signal ports of a second code division multiplexing group associated with a second transmission configuration indicator state, wherein the second code division multiplexing group comprises a second number of demodulation reference signal ports, the first number of demodulation reference signal ports is the same as the second number of demodulation reference signal ports, and the first transmission configuration indicator state is different from the second transmission configuration indicator state.

In certain embodiments, the receiver receives the information by receiving a modulation symbol of the single redundancy version of the single codeword on both of: a first demodulation reference signal port associated with the first transmission configuration indicator state; and a second demodulation reference signal port associated with the second transmission configuration indicator state.

In some embodiments, the information comprises a data layer of a codeword, and the data layer of the codeword is transmitted by a pair of demodulation reference signal ports comprising a first demodulation reference signal port corresponding to the first transmission configuration indicator state and a second demodulation reference signal port corresponding to the second transmission configuration indicator state.

In various embodiments, the information is mapped to all used first demodulation reference signal ports of the first code division multiplexing group and to all used second demodulation reference signal ports of the second code division multiplexing group such that data and redundancy versions corresponding to the data are the same for the first code division multiplexing group and the second code division multiplexing group.

In one embodiment, the receiver receives downlink control information from the at least one network unit.

In certain embodiments, the downlink control information comprises a maximum of two bits to indicate antenna ports from an antenna ports table.

In some embodiments, the antenna ports table comprises a maximum of four rows.

In various embodiments, the antenna ports table consists of entries having the same number of demodulation reference signal ports in the first code division multiplexing group and the second code division multiplexing group.

In one embodiment, the downlink control information comprises a downlink control information format comprising a transmission configuration indicator codepoint indicating two transmission configuration indicator states.

In certain embodiments, the apparatus further comprises a processor that soft-combines signals received from a first demodulation reference signal port associated with the first transmission configuration indicator state and a second demodulation reference signal port associated with the second transmission configuration indicator state.

In some embodiments, the apparatus further comprises a transmitter that transmits radio resource control signaling to the at least one network unit, wherein the radio resource control signaling indicates a capability of the user equipment to receive the information.

In various embodiments, the receiver receives configuration information via radio resource control signaling, and the configuration information indicates a transmission mode used for transmitting the information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
   receive information on a physical downlink shared channel (PDSCH) from at least one base station, wherein the information on the PDSCH comprises a single codeword having a single redundancy version; and the information on the PDSCH is transmitted by:
   first demodulation reference signal (DMRS) ports of a first code division multiplexing (CDM) group associated with a first transmission configuration indicator (TCI) state, wherein the first CDM group comprises a first number of DMRS ports; and
   second DMRS ports of a second CDM group associated with a second TCI state, wherein the second CDM group comprises a second number of DMRS ports, the first number of DMRS ports is the same as the second number of DMRS ports, and the first TCI state is different from the second TCI state, wherein the information is mapped to all used first DMRS ports of the first CDM group and to all used second DMRS ports of the second CDM group such that data and redundancy versions corresponding to the data are the same for the first CDM group and the second CDM group.

2. The UE apparatus of claim 1, wherein the at least one processor is configured to cause the UE to receive the information by receiving a modulation symbol of the single redundancy version of the single codeword on both of:
 a first DMRS port associated with the first TCI state; and
 a second DMRS port associated with the second TCI state.

3. The UE apparatus of claim 1, wherein the information comprises a data layer of a codeword, and the data layer of the codeword is transmitted by a pair of DMRS ports comprising a first DMRS port corresponding to the first TCI state and a second DMRS port corresponding to the second TCI state.

4. The UE of claim 1, wherein the at least one processor is configured to cause the UE to receive downlink control information (DCI) from the at least one base station.

5. A method performed by a base station, the method comprising:
 transmitting information on a physical downlink shared channel (PDSCH) to a user equipment (UE), wherein the information on the PDSCH is transmitted by:
  first demodulation reference signal (DMRS) ports of a first code division multiplexing (CDM) group having a first number of DMRS demodulation reference signal ports; and
  second DMRS ports of a second CDM group having a second number of DMRS ports, wherein the first CDM group is different from the second CDM group, and the first number of DMRS ports is the same as the second number of demodulation reference signal DMRS ports, wherein the information is mapped to all used first DMRS ports of the first CDM group and to all used second DMRS ports of the second CDM group such that data and redundancy versions corresponding to the data are the same for the first CDM group and the second CDM group.

6. A base station, comprising:
 at least one memory; and
 at least one processor coupled with the at least one memory and configured to cause the base station to:
  transmit information on a physical downlink shared channel (PDSCH) to a user equipment (UE), wherein the information on the PDSCH is transmitted by:
   first demodulation reference signal (DMRS) ports of a first code division multiplexing (CDM) group having a first number of DMRS ports; and
   second DMRS ports of a second CDM group having a second number of DMRS ports, wherein the first CDM group is different from the second CDM group, and the first number of DMRS ports is the same as the second number of DMRS ports, wherein the information is mapped to all used first DMRS ports of the first CDM group and to all used second DMRS ports of the second CDM group such that data and redundancy versions corresponding to the data are the same for the first CDM group and the second CDM group.

7. The base station of claim 6, wherein the information comprises a codeword, and the codeword is mapped to resource elements having a layer number equal to a DMRS port number of a plurality of DMRS ports of DMRS in a CDM group.

8. The base station of claim 6, wherein DMRS ports of different transmission configuration indications (TCIs) are in different CDM groups.

9. The base station of claim 8, wherein each demodulation reference signal DMRS port of the demodulation reference signal DMRS ports is indicated in downlink control information (DCI) by a different transmission configuration indicator (TCI) state.

10. The base station of claim 6, wherein the information comprises a data layer of a codeword, and the data layer of the codeword is transmitted by a pair of DMRS ports comprising a first DMRS port corresponding to a first transmission configuration indicator (TCI) state and a second DMRS port corresponding to a second TCI state.

11. The base station of claim 6, wherein the at least one processor is configured to cause the base station to transmit downlink control information (DCI) to the UE.

12. The base station of claim 11, wherein the DCI comprises a maximum of two bits to indicate antenna ports from an antenna ports table.

13. The base station of claim 12, wherein the antenna ports table comprises a maximum of four rows.

14. The base station of claim 12, wherein the antenna ports table consists of entries having the same number of DMRS ports in the first CDM group and the second CDM group.

15. The base station of claim 11, wherein the DCI comprises a DCI format comprising a transmission configuration indicator (TCI) codepoint indicating two TCI states.

16. The base station of claim 11, wherein the DCI comprises:
 a first transmission configuration indicator (TCI) state; and
 a second TCI state, wherein the first TCI state is different from the second TCI state.

17. The base station of claim 6, wherein the at least one processor is configured to cause the base station to transmit configuration information using radio resource control (RRC) signaling to the UE, and the configuration information indicates a transmission mode for transmitting the information.

18. The base station of claim 6, wherein the at least one processor is configured to cause the base station to receive radio resource control (RRC) signaling from the UE, wherein the RRC signaling indicates a capability of the UE to receive the information.

19. A processor for wireless communication, comprising:
 at least one controller coupled with at least one memory and configured to cause the processor to:
  receive information on a physical downlink shared channel (PDSCH) from at least one base station, wherein the information on the PDSCH comprises a single codeword having a single redundancy version; and
  the information on the PDSCH is transmitted by:
   first demodulation reference signal (DMRS) ports of a first code division multiplexing (CDM) group associated with a first transmission configuration indicator (TCI) state, wherein the first CDM group comprises a first number of DMRS ports; and
   second DMRS ports of a second CDM group associated with a second TCI state, wherein the second CDM group comprises a second number of DMRS ports, the first number of DMRS ports is the same as the second number of DMRS ports, and the first TCI state is different from the second TCI state, wherein the information is mapped to all used first DMRS ports of the first CDM group and to all used second DMRS ports of the second CDM group such that data and redundancy versions corresponding to the data are the same for the first CDM group and the second CDM group.

20. The processor of claim 19, wherein the at least one controller is configured to cause the processor to receive the information by receiving a modulation symbol of the single redundancy version of the single codeword on both of:
 a first DMRS port associated with the first TCI state; and
 a second DMRS port associated with the second TCI state.

* * * * *